United States Patent [19]

Singh

[11] 4,335,231

[45] Jun. 15, 1982

[54] SULFUR CURABLE MILLABLE POLYURETHANE GUM

[75] Inventor: Ajaib Singh, Shelton, Conn.

[73] Assignee: Uniroyal, Inc., New York, N.Y.

[21] Appl. No.: 251,007

[22] Filed: Apr. 3, 1981

[51] Int. Cl.$^3$ .............................................. C08G 18/67
[52] U.S. Cl. ..................................... 528/49; 525/452; 528/75; 528/487
[58] Field of Search ...................... 528/49, 75, 487; 525/452

[56] References Cited

U.S. PATENT DOCUMENTS

| | | | |
|---|---|---|---|
| 3,219,633 | 11/1965 | Boussu et al. | 528/75 |
| 3,457,326 | 7/1969 | Kienle | 528/49 |
| 4,289,682 | 9/1981 | Peters | 528/75 |

FOREIGN PATENT DOCUMENTS 835960  11/1975  Belgium .

*Primary Examiner*—Maurice J. Welsh
*Attorney, Agent, or Firm*—Marvin Bressler

[57] ABSTRACT

Elastomeric, sulfur curable millable gum based on polyester/polyether, diisocyanate, unsaturated glycol, diamine and optionally a shortstop.

8 Claims, No Drawings

SULFUR CURABLE MILLABLE POLYURETHANE GUM

This invention relates to a sulfur curable millable polyurethane gum.

It has been desired to produce a polyurethane in a form which could be handled like a rubber gum, that is, stored and shipped as a stable solid, and milled or otherwise processed (e.g., molded, extruded, calindered) like rubber, and vulcanized to an elastomeric state, especially with sulfur. Prior proposals for such a material (e.g., U.S. Pat. No. 3,457,326, Kiende, July 22, 1969) unfortunately have not been as satisfactory as could be desired in certain respects. An objective of the present invention is to provide such a material which can be produced in an advantageous manner and yields valuable vulcanizates having good physical properties.

In accordance with the invention, there is provided a polyurethane gum containing ethylene unsaturation derived from an ethylenically unsaturated glycol, such ethylenic unsaturation serving to confer sulfur vulcanizability on the polyurethane (Belgian Pat. No. 835,960, American Cyanamid Co., Nov. 26, 1975, uses unsaturated glycols, but the present millable gums are not disclosed). In more detail, the invention is concerned with an elastomeric, sulfur curable millable gum typically based on polyester or polyether, diisocyanate, unsaturated glycol (to confer vulcanizability), diamine and optionally a shortstop (e.g., monohydric alcohol), in certain proportions as described hereinbelow.

More particularly, the invention provides a sulfur curable polyurethane millable elastomeric gum comprising a reaction product of:
(a) a polyester or polyether glycol having a melting point not greater than 75° C.;
(b) a diisocyanate;
(c) a diamine;
(d) an unsaturated glycol selected from glyceryl-alpha-allyl ether, monoallyl ether of trimethylolpropane, 1,1-dihydroxymethylcyclohex-3-ene and 1,2-dihydroxymethylcyclohex-4-ene;
(e) optionally a monohydric alcohol having 2 to 20 carbon atoms; and
(f) a catalyst effective to accelerate the reaction between (a), (b) and (c);
wherein the equivalent ratio of (b) to combined (a), (c), (d) and (e) is from 0.9 to 1.2, the equivalent ratio of (c) to (a) is from 0.05 to 0.4, the equivalent ratio of (d) to (a) is from 0.2 to 1.0 and the equivalent ratio of (e) to (a) is from 0 to 0.2, and (f) is present in catalytically effective amounts (e.g. from 0.0005 to parts per 100 parts of (a)).

The stable, millable gum resulting from foregoing combination of ingredients is remarkable for its ability to be sulfur cured to an acceptable level of physical properties, in contrast to certain previously prepared products. Thus, millable gums disclosed in U.S. Pat. No. 3,457,326 referred to above use allylic substituted monoalcohols to confer unsaturation. Such monoalcohols become attached to the polymer in an alpha and omega position (no internal unsaturation), and the resulting gums cannot be sulfur cured to an acceptable level.

The sulfur cured product of the invention is characterized by improved tear strength and abrasion resistance.

Improved viscosity control is possible when making the millable polyurethane gum of the invention, through the use of diamines which allow a broad range of Mooney viscosities to be produced, as desired.

The polyurethane of the invention is formed, as indicated, basically by the reaction of a polyester of polyether (or polyesterether) and a diisocyanate.

In particular, there is employed a linear, essentially saturated polyester or polyether glycol, frequently of molecular weight from 750 or less to 5000 or more, preferably 1000-2500. The acid number of such glycol is ordinarily not greater than 5, preferably not greater than 3, with trifunctionality of 0.5 or less, preferably 0.1 or less.

The melting point of the polyester or polyether glycol is 75° C. or less.

The polyester used may be described as a reaction product of at least one saturated dibasic acid or anhydride with at least one saturated glycol. Suitable dibasic acids include oxalic acid, malonic acid, succinic acid, pentanedioic acid, hexanedioic acid, octanedioic acid, nonanedioic acid, decanedioic acid, dodecandedioic acid, etc., minor amount of aromatic diacids such as phthalic acid, isophthalic acid, terephthalic acid; also suitable cyclohexanedioic acid. Suitable glycols include ethylene glycol, propylene glycol, butylene glycol, pentylene glycol, neopentylene glycol, diethylene glycol, dipropylene glycol, triethylene glycol.

Examples of appropriate polyethers include poly(ethylene ether) glycol, poly(propylene ether) glycol, poly(trimethylene ether) glycol, poly(tetramethylene ether) glycol, poly(pentamethylene ether) glycol, poly(hexamethylene ether) glycol, poly(2-ethyl-1,3-propylene) glycol, poly(2-methyl-1,4-pentylene) glycol, and the like.

Diisocyanates employed in the invention include, 1,6-hexamethylene diisocyanate, 1,4-tetramethylene diisocyanate, 1,10-decamethylene diisocyanate, 1,4-cyclohexylene diisocyanate, 4,4'-methylene-biscyclohexyl isocyanate), m-phenylene diisocyanate, p-phenylene diisocyanate, p,p'-biphenyl diisocyanate, 1,5-naphthalene diisocyanate, 4-chloro-1,3-phenylene diisocyanate, and 1,5 tetrahydronaphthalene diisocyanate, metaxylene diisocyanate, and 2,4-toluene diisocyanate and p,p'-diphenylmethane diisocyanate, etc. Preferred diisocyanates are methylene-bis(4-phenylisocyanate) and tolylene diisocyanate.

The diamine component of the polyurethane functions essentially as a chain extender. Among the suitable diamines may be mentioned tetramethylenediamine, pentamethylenediamine, hexamethylenediamine, p,p'-methylenedianiline, p-phenylenediamine and others; preferred is methylenedianiline. Aromatic diamines have a tendency to provide a stiffer (higher Mooney viscosity) product than aliphatic or cycloaliphatic diamines.

As indicated, the polyurethane of the invention contains residual ethylenic unsaturation (conferring sulfur vulcanizability) derived from the unsaturated glycol component. Particularly suitable are glyceryl-alpha-allyl ether monoallyl ether of trimethylolpropane, 1,1-dihydroxymethylcyclohex-3-ene and 1,2-dihydroxymethylcyclohex-4-ene; preferred are glyceryl-alpha-allyl ether and monoallylether of trimethylolpropane.

Optionally the polyurethane forming reaction mixture further contains a molecular weight regulator, notably a $C_2$–$C_{20}$ aliphatic alcohol such as ethanol, propanol, butanol, hexanol, decanol, dodecanal, tridecanol, tetradecanol, pentadecanol, hexadecanol, heptadecanol; preferred C$_{12}$–C$_{15}$ alcohol or mixtures thereof.

The polyurethane-forming reaction between the described ingredients is facilitated by the presence of a catalyst for the reaction, particularly a catalyst is soluble in the reaction mixture. Mention may be made of heavy metal salts such as cobalt naphthenate, copper octoate, ferric acetylacetonate, dibutyltin dilaurate, diethyltin dioctoate, 1,4-azabicyclo[2.2.2.] octane, diethylcyclohexylamine, N,N'-diphenylehtylamine, generally tertiary amines, preferably diethylcyclohexylamine. Any of the other catalysts that promote urethane and urea formation reactions as described in "Polyurethane Chemistry of Technology", Part 1 Chapter IV, by J. H. Saunders and K. C. Frisch, Interscience Publishers (1962) may be used.

The reaction is carried out by bringing the described ingredients together in a suitable vessel wherein the materials can be mixed or worked. The sequence of addition of the materials is not critical, although it is usually advisable to charge the diamine last. Usually the reaction is carried out in a mixer capable of handling viscous materials, preferably an internal mixer, such as a sigma blade device.

The reaction is preferably carried out under dry conditions, such as may be provided by blanketing the reaction mixture with nitrogen, for example.

The reaction is facilitated by heating the mixture, for example at a temperature of from 50° or less to 150° C. or more, preferably 90°–130° C. Reaction time varies with the particular ingredients, the reaction temperature, and the desired final viscosity. Ordinarily the reaction can be completed within 0.5 hours or less to 4 hours or more, preferably 1 to 2 hours. Molecular weights of the final product are usually within the range of from 20,000 to 500,000, preferably 50,000 to 200,000 (number average). Products having Mooney viscosities of from 20 to 150 (ML-4 at 100° C.) are readily produced. Preferred products have 40–100 Mooney, ML-4 at 100° C.

The millable polyurethane gum of the invention may be compounded for vulcanization with sulfur in accordance with conventional practice, using sulfur and/or sulfur donating curatives, preferably along with one or more accelerators of sulfur vulcanization, activators, fillers, or other suitable compounding ingredients in conventional amounts. The compounding may be effected with the aid of a suitable rubber mixer, such as an open roll mill or an internal mixer. Thereafter the sulfur vulcanizable compounded polyurethane gum may be shaped into the form of a desired article by such conventional shaping processes as injection or compression molding, extrusion or calendering. The shaped article is subjected to conventional elevated vulcanizing temperature for a time sufficient to produce the desired degree of vulcanization.

The following examples, in which all quantities are expressed by weight unless otherwise indicated, will serve to illustrate the practice of the invention in more detail.

EXAMPLE 1

To a 1-gallon sigma-bladed mixer was added 2016 g poly(ethylene-butylene-adipate) glycol (2000 molecular weight, ethylene/butylene ratio 60/40 by weight) and 120 g trimethylolpropane monoallyl ether. The temperature was raised from ca. 24° to 80° C., and then 471 g methylenebis(4-phenylisocyanate) was charged. Within about 15 mintures the temperature had reached 100° C. at which time 2.5 ml diethylcyclohexylamine was charged. The reaction mixture was kept at from 100° to 120° C. until the viscosity reached 400 poise. 38 g p,p'-methylenedianiline was added, and the reaction was continued for another 15 minutes. The gum product was discharged from reactor and cooled. The lightyellow millable gum had a Mooney viscosity (ML-4 at 100° C.) of 70.

The millable gum was subjected to sulfur-type cure according to the following recipe:

| | |
|---|---|
| Product of Ex. 1 | 100 parts |
| MBTS[1] | 4 parts |
| MBT[2] | 2 parts |
| Caytur [trademark]4[3] | 1 parts |
| Carbon black[4] | 20 parts |
| Sulfur | 2 parts |
| Cadmium stearate | 0.5 parts |

The stock was compounded and then cured for 15 minutes at 149° C., resulting in a cured product having the following physical properties

| | |
|---|---|
| Hardness, Shore A | 71 |
| 100% Modulus, psi | 780 (5.38 MPa) |
| 300% Modulus, psi | 2900 (19.99 MPa) |
| Ultimate tensile strength, psi | 4420 (30.48 MPa) |
| Elongation at break, % | 420 |

REMARKS:
(1) mercaptobenzothiazole disulfide
(2) mercaptobenzothiazole
(3) mixture of zinc chloride and MBTS
(4) Philblack [trademark] O

EXAMPLES 4–5

Additional experiments carried out essentially following the procedure of Example 1.

TABLE I

| EXAMPLE | 1 | 2 | 3 | 4 | 5 |
|---|---|---|---|---|---|
| PES[1], g | 2016 | 2000 | 2207 | 1960 | 2360 |
| TMME[2], g | 120 | — | — | — | — |
| GAE[3], g | — | 91 | 79.2 | 105.6 | 79.2 |
| MDI[4], g | 471 | 474 | 500 | 500 | 500 |
| DECA[5], nil | 2.5 | 2.3 | 2.5 | 2.4 | 2.4 |
| SHORTSTOP[6], g | — | — | — | 41.4 | — |
| MDA[7], g | 38 | 30 | 35.6 | 43.6 | 43.6 |
| ML-4 at 100° C. | 70 | 100 | 43 | 33 | 130 |
| RESULTS OF CURE[8] | | | | | |
| HARDNESS, SHORE A | 71 | 73 | 70 | 70 | 70 |
| 100% MODULUS, psi | 780 | 620 | 450 | 390 | 400 |
| 300% MODULUS, psi | 2900 | 2020 | 1240 | 1120 | 1130 |
| ULTIMATE TENSILE, psi | 4420 | 4910 | 4030 | 2650 | 4220 |
| ELONGATION, % | 420 | 570 | 650 | 650 | 720 |

REMARKS:
(1) polyester as in Example 1.
(2) trimethylolpropane monoallyl ether.
(3) glyceryl-alpha-allyl ether.
(4) methylenebis(4-phenylisocyanate).
(5) diethylcyclohexylamine.
(6) mixture of C$_{12}$–C$_{15}$ aliphatic alcohol.
(7) p,p'-methylenedianiline.
(8) same cure as in Example 1.

COMPARISON EXAMPLE

A millable gum was produced according to the teaching of U.S. Pat. No. 3,457,326 using the following reactants:

| PES*, g | 1205 |
| --- | --- |
| Allyl alcohol, g | 8.9 |
| MDI*, g | 200 |
| Catalyst*, ml | 1.2 |
| MDA*, g | 17.6 |

*SEE TABLE I REMARKS.
The millable gum of this invention may also be cured with cure formulations other than the ones incorporating sulfur, such as the ones using peroxides as curatives.

resulting in a product having a Mooney viscosity of 128 (ML-4 at 100° C.).

The product was subjected to a curing step using the recipe and conditions of Example 1, resulting in a substantially uncured gum. Monsanto Rheometer study confirmed inability of this millable gum to be sulfur cured indicating these low/high torque values: 21.1/25/6 (difference +4.5) lb. in.

For the product of Example 5 (essentially the same noncompounded Mooney viscosity, 130) the low/high values under identical conditions were 30.1/85.5 (difference +55.4) lb. in.

What is claimed is:

1. A sulfur curable polyurethane millable elastomeric gum comprising a reaction product of
   (a) a polyester or polyether glycol having a melting point not greater than 75° C.
   (b) a diisocyanate
   (c) a diamine
   (d) an unsaturated glycol selected from glyceryl-alpha-allyl ether, monoallyl ether of trimethylolpropane, 1,1-dihydroxymethylcyclohex-3-ene and 1,2-dihydroxymethylcyclohex-4-ene.
   (e) optionally a monohydric alcohol having 2 to 20 carbon atoms.
   (f) a catalyst effective to accelerate the reaction between (a) (b) and (c) wherein the equivalent ratio of (b) to combined (a), (c), (d) and (e) is from 0.9 to 1.2, the equivalent ratio of (c) to (a) is from 0.05 to 0.4, the equivalent ratio of (d) to (a) is from 0.2 to 1.0 and the equivalent ratio of (e) to (a) is from 0–0.2, and (f) is present in an effective amount.

2. A gum as in claim 1 in which (a) has a molecular weight of from 750 to 5000, an acid number not greater than 5 and a trifunctionality of 0.5 or less.

3. A gum as in claim 1 in which (b) is methylene-bis(4-phenylisocyanate) or tolylene diisocyanate.

4. A gum as in claim 1 in which (c) is methylenedianiline.

5. A gum as in claim 1 in which (e) is present and is a $C_{12}$–$C_{15}$ alkanol or mixture thereof.

6. A gum as in claim 1 in which (a) is poly(ethylenebutylene adipate) glycol, (b) is methylene bis(4-phenylisocyanate), (c) is p,p'-methylenedianiline, and (d) is trimethylolpropane monoallyl ether.

7. A method of making a sulfur curable polyurethane millable elastomeric gum comprising providing the ingredients recited in any one of claims 1 to 6 in the proportions recited, and heating the resulting mixture at 50°–150° C. for 0.5–4 hours.

8. A gum as recited in any one of claims 1 to 6 in a sulfur-vulcanized state.

* * * * *